United States Patent [19]

Francis

[11] 4,450,916
[45] May 29, 1984

[54] EARTH CLOD PULVERIZER

[76] Inventor: Thomas E. Francis, 1814 Lakeside Dr., Quinton, Va. 23141

[21] Appl. No.: 399,939

[22] Filed: Jul. 19, 1982

[51] Int. Cl.³ .................... A01B 27/00; A01B 35/08
[52] U.S. Cl. ................................. 172/147; 172/197
[58] Field of Search .............. 172/197, 198, 688, 689, 172/713, 770, 730, 731, 732, 747, 148, 149, 142, 687, 694, 684.5, 721

[56] References Cited

U.S. PATENT DOCUMENTS

| | | | |
|---|---|---|---|
| 17,925 | 8/1857 | Forsythe | 172/731 |
| 37,061 | 12/1862 | Steller . | |
| 60,449 | 12/1866 | Watson | 172/689 |
| 160,444 | 3/1875 | Leonard | 172/731 |
| 214,667 | 4/1879 | Keller . | |
| 219,229 | 9/1879 | Deisher . | |
| 289,656 | 12/1883 | Hill . | |
| 330,952 | 11/1885 | Winger . | |
| 430,016 | 6/1890 | Harvey | 172/721 X |
| 638,137 | 11/1899 | Phillips | 172/147 |
| 640,514 | 1/1900 | Ernst | 172/197 |
| 832,350 | 10/1906 | Thorp | 172/688 X |
| 1,281,358 | 10/1918 | Hardy . | |
| 1,439,290 | 12/1922 | Butts | 172/63 X |
| 1,453,998 | 5/1923 | Roberts | 172/689 X |
| 1,462,120 | 7/1923 | Monroe | 172/197 |
| 1,587,223 | 6/1926 | Ferris . | |
| 1,592,731 | 7/1926 | Francis . | |
| 1,755,631 | 4/1930 | Burnett | 172/684.5 |
| 2,259,170 | 10/1941 | Lockridge | 55/23 |
| 2,971,588 | 2/1961 | Schwab | 172/146 |
| 3,122,202 | 2/1964 | Crites | 172/197 X |
| 3,556,228 | 1/1971 | Mork | 172/199 |

Primary Examiner—Richard J. Johnson
Attorney, Agent, or Firm—Griffin, Branigan & Butler

[57] ABSTRACT

An earth clod pulverizing and earth smoothing implement (10) has rows of heavy, cast-iron, pointed teeth (14a–v) which are wedge-shaped in cross section with the cutting edges (42) of the wedges defining substantially vertical lines facing the forwardly direction. The implement further includes downwardly directed channel irons (16a–d) after each row of teeth, with each successive channel iron being mounted slightly lower than the one in front of it. The front leg (54) of each channel iron is shorter than the back leg (56). The implement (10) also includes downwardly directed side walls (18a and b), an upwardly flared front member (20) and a downwardly flared rear, smoothing, member (22). A channel iron (16e) having equal sides is mounted on the downwardly flared smoothing member (22). The teeth are spaced two feet apart in the rows, and the rows of teeth are spaced 14 inches apart.

12 Claims, 6 Drawing Figures

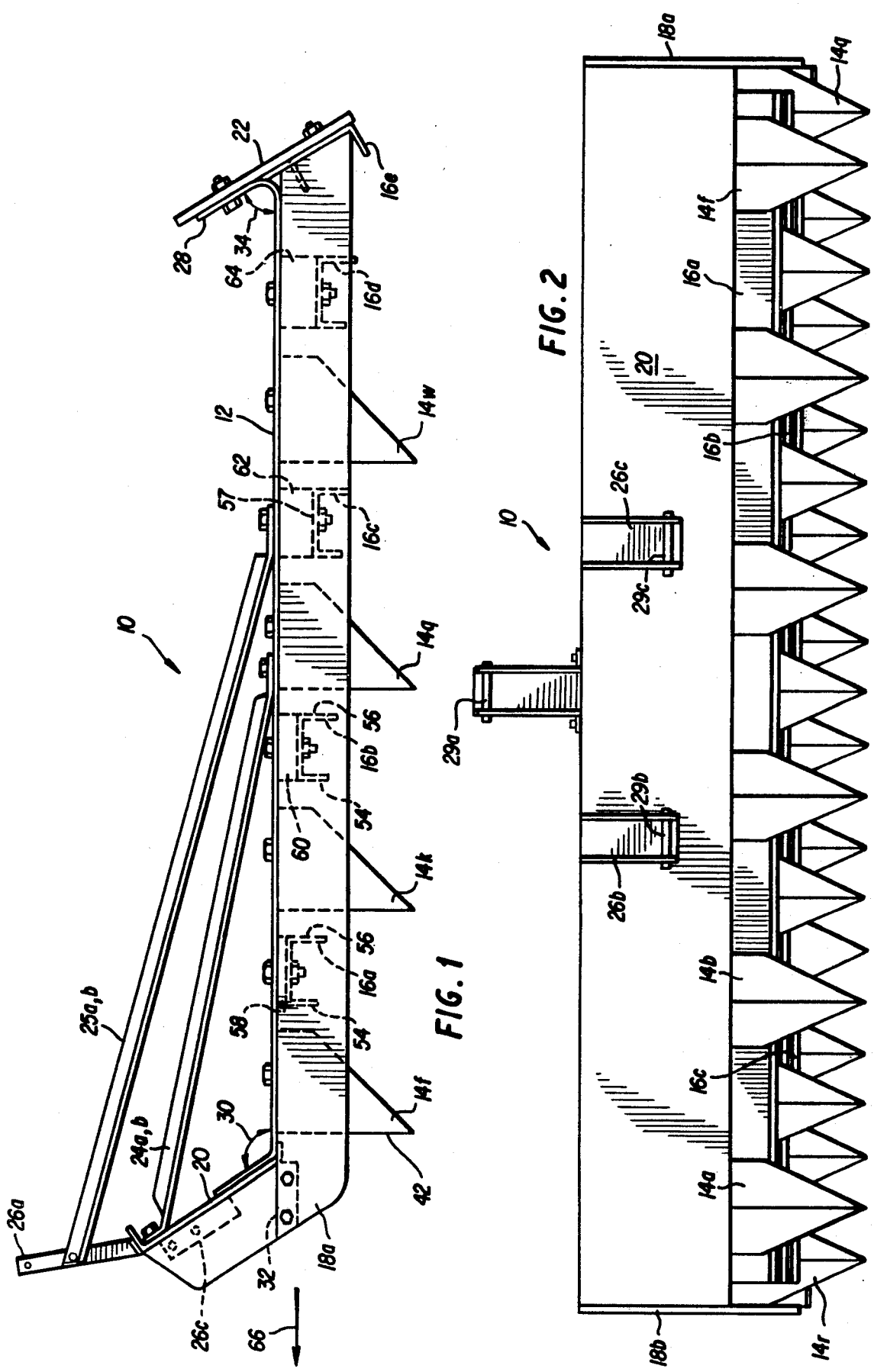

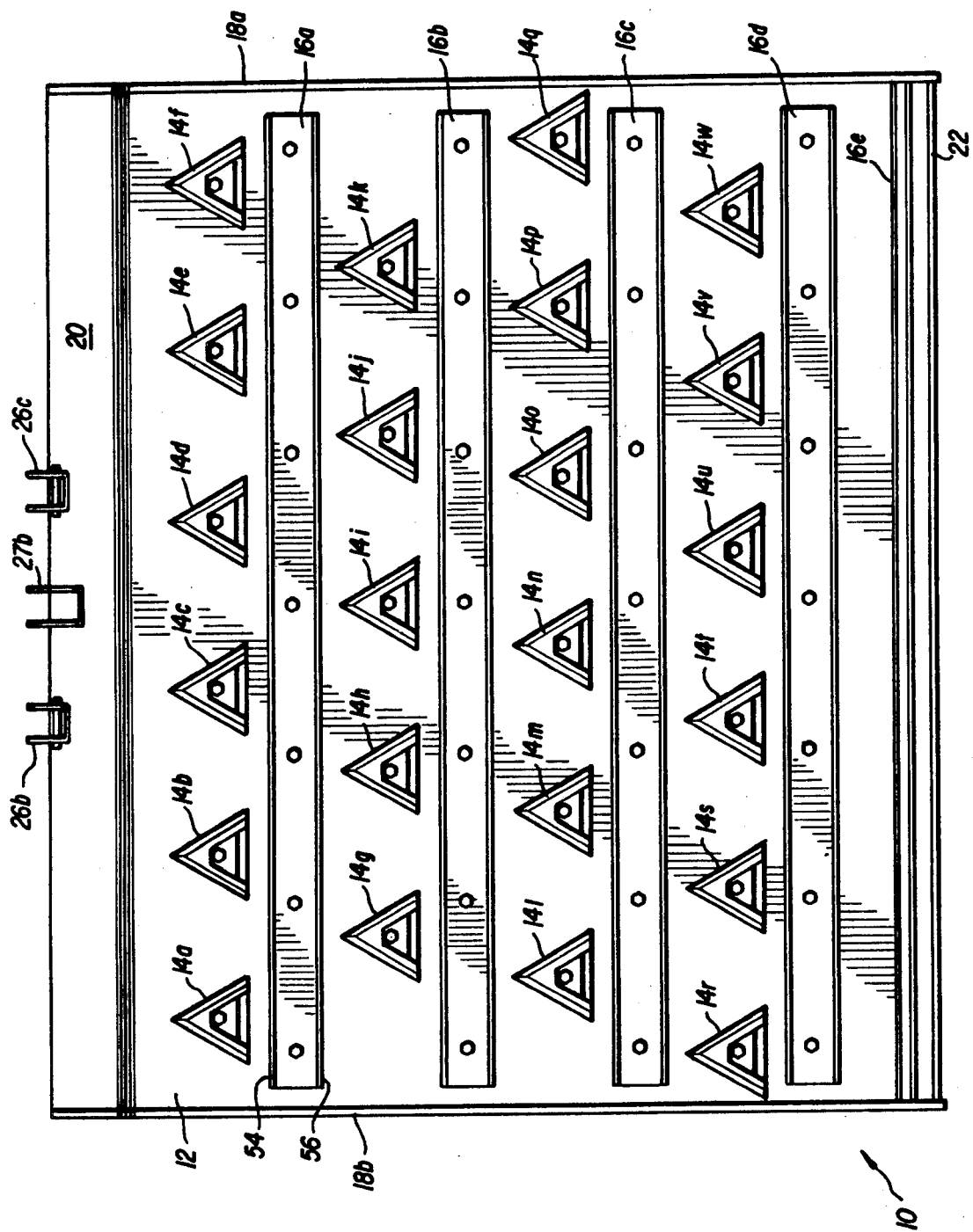

EARTH CLOD PULVERIZER

BACKGROUND OF THE INVENTION

This invention relates generally to the art of earth-surface preparing machines, and more specifically to a surface finishing implement which is moved across a surface to pulverize clods, smooth the surface, and generally "firm up" the surface. Even more specifically, this invention provides improvements to the surface pulverizer described in U.S. Pat. No. 1,592,731 of T. E. Francis.

When preparing the earth's surface for farming, laying concrete, construction, or the like, it is often desirable, after the soil has been loosened, plowed, or the like, to break large dirt clods into smaller clods or dust so that the earth's surface can be made smoother than would otherwise be the case. In particular, in farming, after a field has been plowed and disced, large dirt clods often remain on the field's surface so that the surface is rough and jagged. Such clods and jagged protrusions give up undue amounts of moisture to the atmosphere and for this reason, as well as others, do not make good seed beds. Thus, prior to sowing, it is usually desirable to break up the clods and smooth the surface.

A number of implements have been suggested for clod pulverizing and surface smoothing, however, no one implement has gained general and widespread use. Some such implements are described in U.S. Pat. Nos. 214,667 to Keller, 37,061 to Steller, 1,592,731 to Francis, 289,656 to Hill, 330,952 to Winger, 1,281,358 to Hardy, 1,587,223 to Farris, 219,229 to Deisher, 2,259,170 to Lockridge, 2,971,588 to Schwab, and 3,556,228 to Mork. Additional pulverizers, and ground leveling machines of a rotary type also exist.

The above-identified patents suffer from one or more of the following faults:
1. They do not properly break up clods located on the surface;
2. They do not properly break up clods located under the surface;
3. They collect trash and debris as they are pulled along, thus decreasing their effectiveness;
4. They do not leave fields smooth with dust-mulched surfaces; and/or
5. They are not effective unless the soil is of a specific, and desirable moisture content.

It is an object of this invention to provide a clod pulverizing, and earth smoothing, implement which pulverizes clods located both relatively deep in the soil and on the surface but which does not excessively pick up debris. Further, it is an object of this invention to provide a clod pulverizing, and earth smoothing implement which leaves a desirable dust mulch on a field for holding moisture in the field. Still further, it is an object of this invention to provide such an implement which effectively operates in various moisture-content fields. In addition, it is an object of this invention to provide such an implement which is relatively inexpensive to manufacture and use, but which is extremely effective in preparing a highly desirable seed bed or other surface-finished earth work.

SUMMARY

According to principles of this invention, an earth clod pulverizing and earth smoothing implement employs a heavy flat frame having rows of pointed, wedge-shaped, teeth extending downwardly therefrom, with the cutting edges of the wedges defining substantially vertical lines facing the forwardly direction of the implement. Further principles of this invention include channel-iron bars which are positioned between the rows of the teeth with the legs thereof protruding downwardly. A front leg on each channel bar is shortened, and each successive channel bar is mounted lower than the preceding channel bar. Still further in accordance with principles of this invention, an angled, following, smoothing member is mounted on the back end of the flat frame which also has a channel bar mounted thereon. Also, in accordance with principles of this invention, the flat frame has side walls extended downwardly therefrom and a leading, upwardly flared, surface extending therefrom.

The teeth are cast of iron to be rather heavy, weighing around 31 pounds per tooth. The entire structure weighs approximately 2,500 pounds thereby forcing the pointed teeth down into the already plowed soil.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side view of an earth clod pulverizing and earth smoothing implement of this invention;

FIG. 2 is a front view of the implement of FIG. 1;

FIG. 3 is a bottom view of the implement of FIG. 1; and

DESCRIPTION OF THE PREFERRED EMBODIMENT

Figure 4:
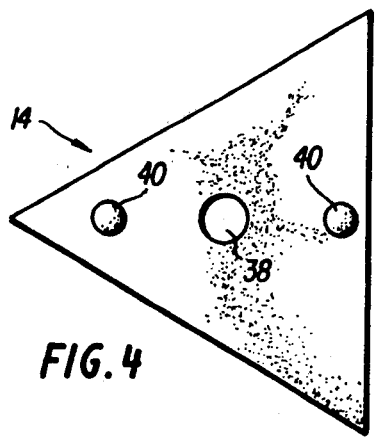
FIGS. 4, 5 and 6 are respectively top, side and bottom views of a tooth of the implement of FIG. 1.

Referring now to the drawings, an earth clod pulverizing and earth smoothing implement 10 includes a flat frame 12, twenty-three teeth 14a-v, five lateral bars 16a-e, two side wall members 18a-b, an upwardly flared leading edge member 20, and a downwardly flared trailing edge member 22. There are four additional supporting bars 24a and b and 25a and b (the bars 24b and 25b cannot be seen in FIG. 1 because they are hidden behind bars 24a and 25a) and tow fittings 26a, b and c however, these members are substantially conventional in nature and it is not thought necessary to describe them in detail other than to mention that they are constructed of steel and are sufficiently strong to support the implement for towing, lifting and controlling the implement's attitude relative to the field's surface.

The flat frame 12 is formed of a flat steel sheet that is 12'×6'×¼". This sheet is bent at its rear edge 28 to form a mounting bracket for the downwardly angled trailing edge member 22 which is bolted thereto through slotted openings (not shown) in the trailing edge member 22 so that the trailing edge member 22 can be adjusted upwardly and downwardly. The trailing edge member 22 is made of a 12'×10"×¼" flat steel sheet and is mounted on a 30° angle to the vertical.

The leading edge member 20 is constructed of a flat steel sheet 12'×16"×¼" which is bolted to a bend in the flat frame 12 at the 120° angle 30 to also form a 30° angle to the vertical. In this respect, the member 20 has three inches thereof bent to fit beneath the frame 12 for bolting and protecting the frame 12.

The side wall members 18a and b are formed of ¼" angle iron which are bolted to the bottom side of the flat frame 12 and the leading edge member 20. In the depicted embodiment, two angle iron members, which are bolted at a line 32 (FIG. 1) are used to form each wall member.

The flat frame 12, from the angle 30 to a rear 30° angle 34, is around five feet in depth and is 12 feet in width. The side-wall members 18a and b are approximately four inches in length, that is, they extend downwardly four inches from the bottom surface of the flat frame 12. Basically, the flat frame 12 and the leading edge member 20, form a heavy frame onto which earth-engaging members are mounted to extend downwardly into the earth. In this regard, the sidewall members 18a and b and the trailing edge member 22 form some of these earth-engaging members. It should be appreciated, that the heavy weight of all of these elements contributes to the successful operation of this invention by creating downward force to cause these, and other earth-engaging members (teeth 14a–v and lateral bars 16a–e) to dig into the earth.

Figure 5:
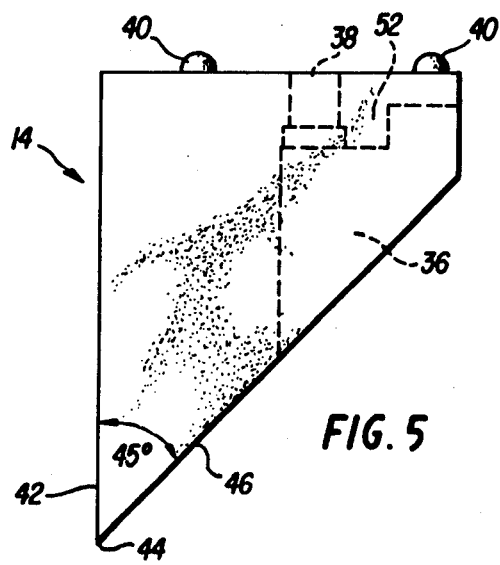
Figure 6:
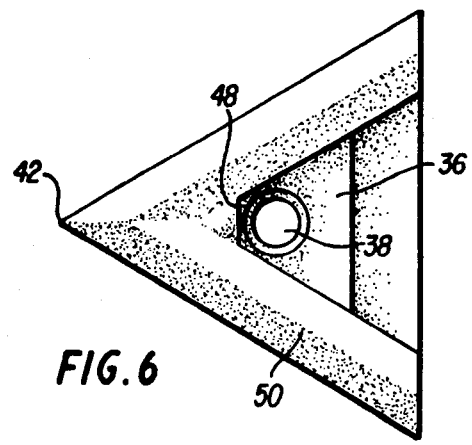

The teeth 14a–v, shown in more detail in FIGS. 4, 5 and 6, are cast of iron to be extremely solid and heavy, weighing 31 pounds each. It is noted that the teeth are hollowed out somewhat at 36 to enable the teeth to be bolted through holes 38 to the flat frame 12. Protrusions 40 on top of the teeth extend into indentations in the flat frame 12 to hold the teeth in their proper orientations, with wedge cutting edges 42 facing forwardly. In this respect, in cross section, the teeth have a wedge shape, with the wedge defining a triangle with each side being seven inches long at the plane where the teeth attach to the flat frame 12. The wedge cutting edge 42 is vertical, while its bottom tip 44 is pointed, with the trailing side 46 tapering upwardly therefrom to form an angle of approximately 45° with the wedge cutting edge 42. The length of the teeth (that is, the length of the wedge cutting edges 42) depends upon the application. If the implement 10 is being used for orchards, the presently preferred length of the teeth is approximately six inches. On the other hand, for turn-plowed fields, the presently preferred length of the teeth is eight inches, while for chisel plowed fields it is 10 inches.

Although the cavity 36 is approximately triangular in cross section, the front side 48 thereof is blunt to give the teeth more strength. The sides of teeth 50 which form the cavity 36 are approximately one inch thick while there is approximately two and three-quarter inches between the wedge cutting edge 42 and the front side 48 of the cavity 36. A top wall 52 forming the cavity 36 is approximately one inch thick.

The teeth in each row are ideally spaced apart at least on one and one-half feet centers, but in the preferred embodiment, they are spaced approximately on two feet centers apart. That is, hole 38 of tooth 14a is spaced two feet from hole 38 of tooth 14b. Similarly, in the preferred embodiment, each row of teeth is spaced at least on a 12 inch center behind the previous row of teeth, and in the illustrated embodiment it is spaced 14 inches from the preceding row. That is, the row formed by mounting holes 38 of teeth 14a, 14b, etc. is 14 inches in front of the row formed by mounting holes 38 of teeth 14g, 14h, etc.

The spacings of the teeth and the vertical leading front edges of the teeth are important in preventing material from being caught and dragged by these members as well as for allowing the wedge shaped teeth to force clods together to crush them.

The lateral bars 16a–d are centered midway between mounting holes 38 for the teeth, thus, they are mounted seven inches behind each of the rows of teeth mounting holes. The lateral bars 16a–e are actually formed of channel irons which are one-half inch thick for strength. These channel irons are four inches wide, with legs 54 and 56 thereof extending downwardly from a base 57. The forward legs 54 of the channel irons 16a–d have been cut off by one inch so that they are only one and one-half inches long, while the trailings legs 56 are two and one-half inches long. This arrangement enables the forward legs 54 to pass over small clots, leaving them for the trailing legs 56 so that the forward legs 54 are only used for larger clods. Similarly, the forward-most lateral bar 16 is mounted on a half-inch spacer 58, the next lateral bar 16b is mounted on a one-inch spacer 60, the next lateral bar 16c is mounted on a one and one-half inch spacer 62, and the next lateral bar 16d is mounted on a two-inch spacer 64. As with the forward teeth 54 only engaging larger clods, this arrangement allows the lateral bars to be more effective with forward-most bars concentrating on larger clods and rearmost lateral bars concentrating on smaller clods.

The purpose of the trailing edge member 22 is to finely smooth and firm up the soil while leaving a dust mulch on the surface for holding moisture in the soil. This member has been found to be more effective by mounting a channel iron 16e with legs of equal length thereon. Operation of this channel iron, and the reason it is more effective in finely busting up clods, smoothing the soil, and leaving a dust mulch is not fully understood by the inventor, however, this element has proven to be effective in tests.

In operation, teeth of a proper length are mounted on the flat frame 12 depending on the application of the implement 10. For orchard work, it is presently thought that the teeth should be six inches long, while turn-plowed fields should require eight inch teeth and chisel plowed fields ten inch teeth. The implement 10 is then engaged by a tractor at tow fittings 26a, b and c and towed through a field to be treated. In this respect, in towing the implement 10 one must be careful to so engage the tow fittings 26a–c that the implement 10 is not towed at an angle, but rather the flat frame 12 should be approximately horizontal with the surface of the earth. Further, one should allow the weight of the implement to force the teeth 14a–v, and the other earth-engaging members, downwardly into the earth. As the implement 10 is towed in a forwardly direction, as indicated by arrow 66 in FIG. 1 the teeth 14a–v bust up clods that are located both on the surface and as deep as 10 inches below the surface. Many of the clods located below the surface are busted up below the surface, however, many others are rooted up to the surface and are subsequently busted up when they are forced together by the wedge-shaped teeth 14a–v or are pulverized by the staggered bars 16a–e. In this respect, the side walls 18a and b hold clods and dirt which enter under the leading edge member 20 in the vicinity of the teeth and lateral bars to aid in the crushing of clods which are forced between teeth and the side members. Were these side members not present, many clods would work themselves to the sides and away from the earth engaging members.

It will be appreciated by those skilled in the art that the vertical leading edges 42 of the teeth enable the teeth to dig deeply into the soil, while they do not unduly pick up debris. If these teeth were substantially slanted backwardly, they would tend to rise in the soil and therefore not pulverize as deeply or root out clods as efficiently. If these teeth were substantially slanted forwardly, they would pick up more debris.

It will also be appeciated that the lateral bars 16a–d, with their shorter forward legs 54, effectively engage larger clods with higher members, and smaller clods with lower members so that the machine operates more efficiently. If all these members were mounted at the same depth some of them would engage larger clods to lift others which would virtually do nothing at that particular instant. It should also be appreciated that the relatively large side and rear spaces between the teeth are extremely beneficial. In this respect, one can see in FIG. 2 that in a line perpendicular to the forward direction there is a tooth every six inches, although in each row the teeth are spaced on two foot centers. In this respect, the first row of teeth 14a–f is centered on the flat frame 12 while the teeth of the second row 14g–k are centered in spaces between teeth of the first row. The third row teeth are centered in odd spaces between teeth of the first and second row while teeth of the fourth row are centered in even spaces between teeth of the first and second row. In any event, however, the fact that adjacent teeth are so far apart, minimizes the catching of debris by the teeth while allowing the teeth to function more effectively in rooting out clods. On the other hand, the teeth are close enough together that their wedge shapes can force the clods together, thereby crushing them.

This invention is useful both for highway construction and for farming, however, to date it has only been tested for farming. It has been found that the implement of this invention provides a seed bed which is dust mulched to hold its moisture for germination of seeds. The invention has been found to be particularly useful for preparing alfalfa fields.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. An earth clod pulverizing and earth smoothing implement of a type to be moved across the surface of the earth in a forwardly direction of travel while engaging the earth to break apart relatively large clods near the earth's surface and otherwise prepare the earth's surface for further use, said implement comprising a frame for defining a supporting surface to be approximately parallel to the earth's surface while said implement is in use and for supporting earth-engaging members extending from said supporting surface downwardly, said earth-engaging members including teeth; the improvement wherein said teeth are wedge-shaped in cross section taken on a plane parallel to the earth's surface, with the cutting edge of each wedge defining a substantially vertical line facing the forwardly direction with relatively flat sides of the wedge flaring rearwardly and laterally of the forwardly direction, and said teeth having pointed tips directed downwardly into the earth's surface with trailing sides of said teeth sloping upwardly from said pointed tips a vertical distance of substantially greater than half the lengths of the teeth, said teeth being constructed of a cast metal and each tooth weighing at least 25 pounds.

2. In an implement as in claim 1 wherein said earth engaging means further includes lateral, downwardly extending bars mounted on said supporting surface behind rows of said teeth, the lateral bars being mounted to said supporting surface on successively larger spacers so that successive bars, from the leading bar to the rear bar, extend downwardly from the frame deeper than preceding bars.

3. In an implement as in claim 1 wherein said earth-engaging means further includes lateral, downwardly-extending bars positioned behind rows of said teeth said downwardly extending bars being channel irons whose legs are directed downwardly, the front legs on said channel irons being shorter than back legs thereof.

4. In an implement as in claim 3 the further improvement wherein said ground-engaging members include a smoothing element mounted at the rear edge of said frame which extends rearwardly and downwardly from said frame and wherein said smoothing member has a channel iron mounted thereon with legs thereof being directed perpendicularly away from said smoothing member.

5. In an implement as in claim 3 with the further improvement that said teeth are at least one and one-half feet apart laterally, with rows of said teeth being spaced at least one foot apart.

6. In an implement as in claim 5 wherein said teeth in each row are approximately two feet apart and said rows are approximately 14 inches apart.

7. In an implement as in claim 3 wherein said teeth are positioned so that the points of said teeth will define lines as they are dragged in said forwardly direction which are approximately six inches apart.

8. In an implement as in claim 1 the further improvement wherein said ground-engaging members include a following smoothing member which is mounted on said frame and which extends downwardly and rearwardly from said frame and wherein a channel iron is mounted on said smoothing member.

9. In an implement as in claim 1 with the further improvement that said teeth are at least one and one-half feet apart laterally and rows of teeth are at least one foot apart.

10. In an implement as in claim 9 with the further improvement that said teeth are triangular in shape and whose sides at the upper ends thereof are around 7 inches in length.

11. In an implement as in claim 1 with the further improvement that the points of said teeth are arranged to move along lines parallel to said forward direction which are approximately six inches apart.

12. In an earth clod pulverizing and earth smoothing implement of the type to be moved across the surface of the earth in a forwardly direction of travel while engaging the earth to break apart relatively large clods near the earth's surface and otherwise prepare the earth's surface for further use, said implement comprising a frame for defining a supporting surface to be approximately parallel to the earth's surface being prepared while said implement is in use and for supporting earth-engaging members extending from said supporting surface downwardly, said earth-engaging members including teeth arranged in rows perpendicular to the direction of travel of the pulverizing/smoothing implement;

the improvement wherein channel irons are mounted on said supporting surface lateral to the forward direction of travel between rows of teeth, said channel irons having legs extending downwardly from said frame into said earth, the front legs of said channel irons being shorter than the back legs thereof so that they do not extend downwardly from the frame as far as the back legs thereof; and, the further improvement that a smoothing member is mounted on the frame so as to extend downwardly and rearwardly therefrom and wherein a channel iron is mounted on said smoothing member with the legs of said channel iron extending perpendicularly away from said smoothing member.

* * * * *